(No Model.) 2 Sheets—Sheet 1.

G. S. GUNDERSEN.
CORN HUSKING MACHINE.

No. 554,264. Patented Feb. 11, 1896.

Witnesses.
Irving Longenecker.
A. T. Fiorini

Inventor.
G. S. Gundersen,
by Attorney.
R. J. McCarty.

(No Model.) 2 Sheets—Sheet 2.

G. S. GUNDERSEN.
CORN HUSKING MACHINE.

No. 554,264. Patented Feb. 11, 1896.

Witnesses.
Irving Longenecker.
A. J. Fiorini

Inventor.
G. S. Gundersen.
by Attorney
R. J. McCarty

UNITED STATES PATENT OFFICE.

GILBERT S. GUNDERSEN, OF MIDDLETOWN, OHIO.

CORN-HUSKING MACHINE.

SPECIFICATION forming part of Letters Patent No. 554,264, dated February 11, 1896.

Application filed November 2, 1895. Serial No. 567,676. (No model.)

*To all whom it may concern:*

Be it known that I, GILBERT S. GUNDERSEN, of Middletown, county of Butler, State of Ohio, have invented a new and useful Improvement in Corn-Husking Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in corn-husking machines.

The object of the invention is to provide certain improvements in the means for removing the husks from the ears, and to provide an improved tooth for the shredding-cylinder and husking-roller, as will be more fully described hereinafter, in connection with the accompanying drawings, of which—

Figure 1:
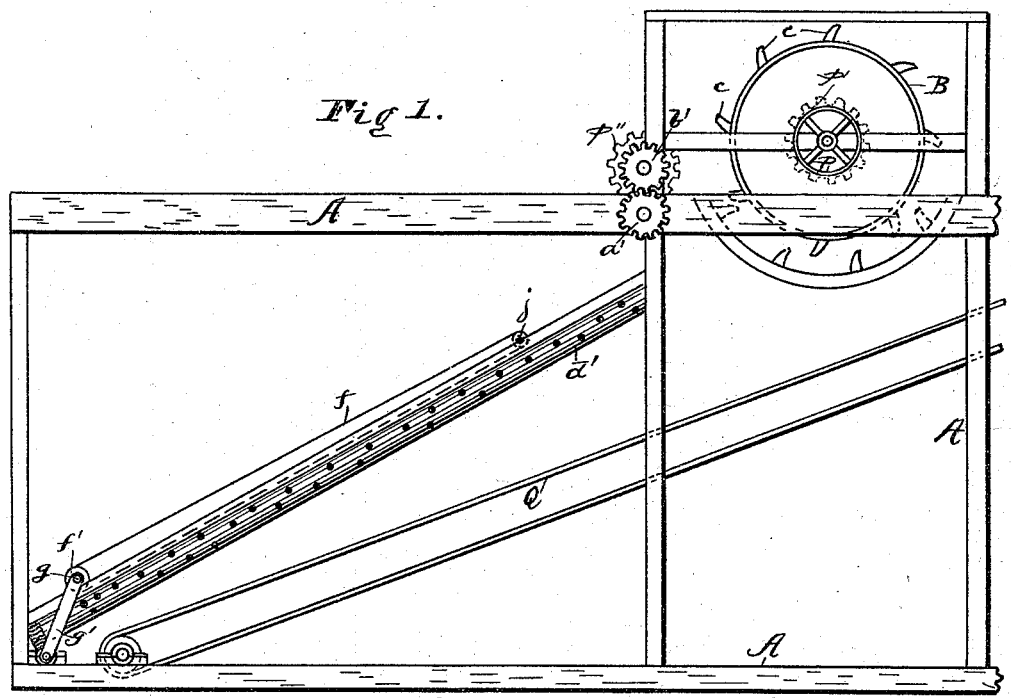
Figure 2:
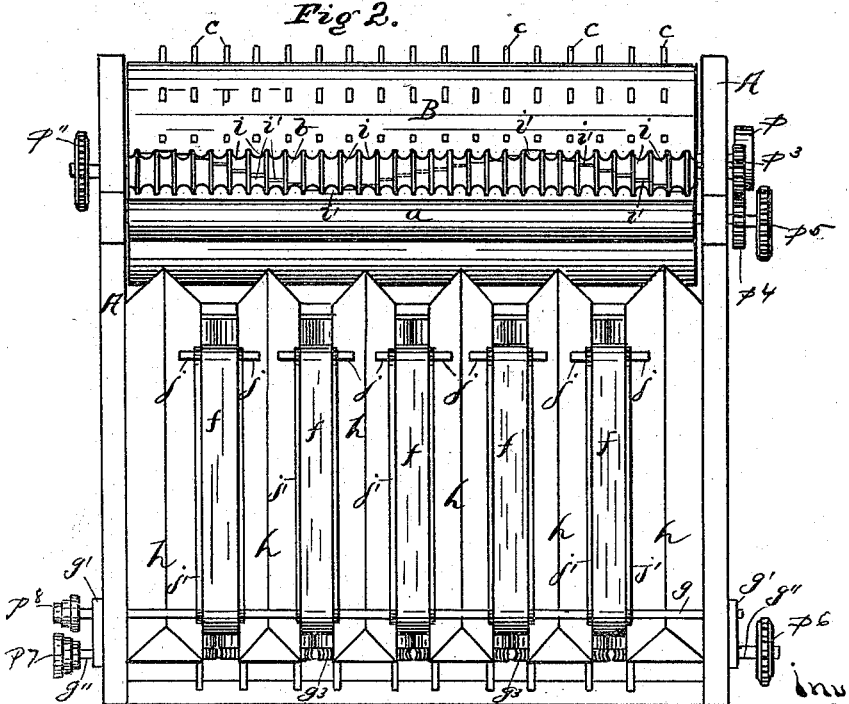
Figure 3:
Figure 4:
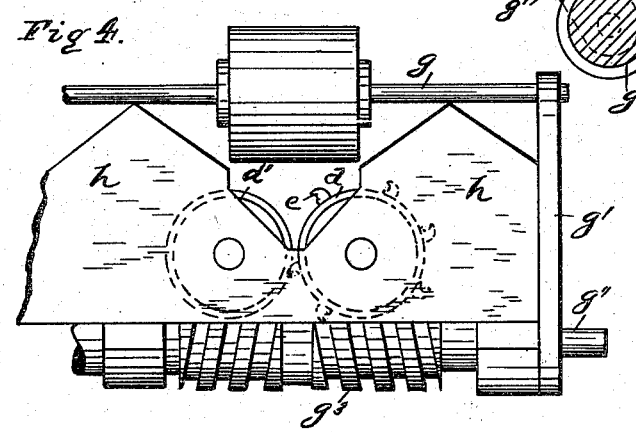
Figure 5:
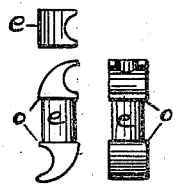
Figure 6:
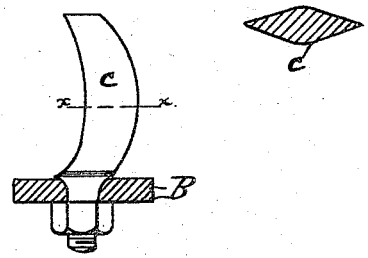
Figure 7:
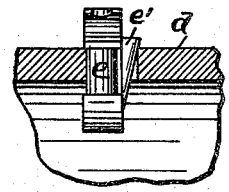

Figure 1 is a side elevation of a portion of the frame containing my improvements. Fig. 2 is a top view of Fig. 1. Fig. 3 is an enlarged side elevation, partly in section, of one of the husking-rollers and belts. Fig. 4 is an end elevation of Fig. 3. Fig. 5 are detached detail views of a husking-tooth. Fig. 6 are detached detail views of a shredding-tooth. Fig. 7 is a sectional view of a portion of a husking-roller, showing one of the teeth therein.

The letter A designates the supporting-frame, or rather that portion of the frame upon which the snapping, husking and shredding cylinders are mounted, and which is dismounted from the wheels.

$a$ and $b$ designate, respectively, the smooth and corrugated snapping-rollers, which are journaled in suitable bearings in the frame and have intermeshing spur gear-wheels $a'$ and $b'$. The latter roller—to wit, $b$—has a series of annular ribs throughout its length, which provide a corresponding number of annular grooves $i$, each of which is divided by a transverse rib $i'$. These ribs $i'$ are out of a horizontal alignment, substantially as shown in Fig. 2, so that they extend spirally around the circumference of the roller. By this construction of said roller there is but one point of contact with each stalk upon each revolution of the roller. Therefore the stalks that are not in contact with ribs $i'$ are in their respective grooves $i$ and are relieved of any pressure that might cause a separation of the rollers.

B designates the shredding-cylinder which is mounted in the rear of and parallel with the snapping-rollers. The construction and mounting of the cylinder are well known. The teeth $c$, however, have a double cutting-edge and are curved substantially as is shown in Fig. 6. This form of tooth effects a thorough splitting and cutting up of the fodder, and is adapted to cut dry or wet fodder with equal facility by reversing the position of said tooth.

$d$ and $d'$ designate the husking-rollers, the former having teeth $e$ and the latter corresponding openings. The teeth $e$ are constructed with a double point, as shown in Fig. 5, which enables said teeth to enter the husks easily, thereby avoiding the crowding of the ears away. This double point of said teeth enables them to obtain a strong hold on the husk, and by providing an engaging-point at each end the said teeth may be reversed and thereby made serviceable for a greater length of time. As shown in Fig. 7, these teeth are secured by means of wedges $e'$, that are driven into the openings in which the teeth are inserted. The shoulders $o$ on said teeth prevent them from working in or out of the cylinder or roller, while the wedges hold said teeth firmly in position.

$f$ designates a series of endless belts above the husking-rollers and parallel therewith. These belts serve to prevent the ears of corn from rising endwise on the rollers while passing over said rollers, and otherwise maintain said corn in a position to be acted upon by the rollers. The said belts inclose rollers $f'$ at the lower end of the machine, that are mounted on a transverse shaft $g$, journaled in arms $g'$ on each side of the frame. The lower ends of said arms $g'$ are loosely mounted on a shaft $g''$ of a worm $g^3$. The said shaft $g$ normally rests upon the apexes of a series of guides $h$, that are rigidly mounted in the frame above the husking-rollers and parallel therewith. The upper surfaces of these bars $h$ incline substantially as shown in Fig. 4, and thus form guides to direct the ears of corn between the rollers.

$j$ designates a series of short shafts each of which has mounted thereon a roller, around which the belts $f$ pass. These shafts $j$ are each journaled in arms $j'$, the lower ends of which are loosely mounted on the shaft $g$, and the said shafts $j$ also normally rest upon the ridges of the guides $h$. The mountings of the rollers at both ends of the belts are flexible, so that said belts may rise at one or both ends or throughout their length, in order to permit any suitable quantity of corn to pass to the husking-rollers, and also to allow the upper ends of said belts to be elevated when oiling the machine below.

Power is primarily introduced to the machine through pulley $p$ on the shaft of the shredding-cylinder. The corrugated snapping-roller is driven by a chain (not shown) which runs on wheels $p'$ and $p''$. $p^3$ designates a spur gear-wheel on said corrugated roller that meshes with a similar wheel $p^4$ on the shaft of the snapping-roller $a$. The worm-gear $g^3$ is driven by a chain (not shown) through chain-wheels $p^5$ and $p^6$, the former of which is on the shaft of the snapping-roller $a$. This worm-gear drives the husking-rollers in a well-known manner, and also the belts $f$ through cone-pulleys $p^7$ and $p^8$, the former of which is on the shaft of said worm-gear and the latter of which is on shaft $g$.

Q designates a conveyer by which the husks are carried from the machine.

Having described my invention, I claim—

1. In a corn-husking machine, the combination of the roller $a$, the roller $b$ provided with non-communicating annular grooves $i$ each of which is divided by a transverse rib $i'$, the said ribs $i'$ being at a different point in each of said grooves, so that each stalk of corn will come in contact with a rib $i'$ but once in each revolution of the roller $b$, substantially as described.

2. In a corn-husking machine, the combination with the husking-rollers, of the parallel guide-bars mounted above said rollers, the said bars having a longitudinal ridge on their upper side, revolving belts inclosing the space between said bars and above the husking-rollers, rollers over which said belts pass, and flexible bearings for said rollers, whereby the said belts may be permitted to rise above the normal positions substantially as described.

3. In a corn-husking machine, the combination with the husking-rollers, and parallel guide-bars to guide the corn thereto, of a series of parallel belts mounted above the space intervening between said bars, rollers upon which said belts are mounted, a series of short shafts upon which the upper rollers are mounted, and a shaft extending across the machine upon which the lower rollers are mounted, and flexible arms upon which said shafts are mounted, substantially as described.

4. In a corn-husking machine, a tooth for a husking-roller having each end curved in an opposite direction, and provided with two points, and the body of said tooth being reduced in diameter so as to form an annular shoulder at the point where said ends curve, substantially as herein shown and described.

5. In a corn-husking machine, a tooth for a shredding-cylinder, having the double edge, and the curve, as herein shown and described.

In testimony whereof I have hereunto set my hand this 21st day of October, 1895.

GILBERT S. GUNDERSEN.

Witnesses:
C. W. DUSTIN,
R. J. MCCARTY.